United States Patent
Belzile (10) Patent No.: US 6,393,122 B1
(45) Date of Patent: May 21, 2002

(54) METHOD AND DEVICE FOR PROVIDING INTERMEDIATE TELEPHONE SERVICE WITH ENHANCED NETWORK RELIABILITY

(75) Inventor: Pierre Belzile, Lachine (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/144,109

(22) Filed: Aug. 31, 1998

(51) Int. Cl.[7] .............................. H04M 3/00; H04M 7/00
(52) U.S. Cl. .................... 379/258; 379/221.14; 379/229
(58) Field of Search ................................ 379/258, 230, 379/211, 219, 220.01, 221.14, 229, 242, 227

(56) References Cited

U.S. PATENT DOCUMENTS

| 4,771,425 A | 9/1988 | Baran et al. ................. 370/458 |
| 4,969,184 A | 11/1990 | Gordon et al. ......... 379/100.13 |

(List continued on next page.)

FOREIGN PATENT DOCUMENTS

| AU | B-56456/94 | 7/1996 | .......... H04M/11/06 |
| CA | 2110711 | 1/1993 | ............ H04M/3/42 |
| CA | 2197204 | 2/1996 | ............ H04M/3/42 |
| CA | 2167215 | 7/1997 | ............ H04M/3/42 |
| EP | 0 732835 A2 | 9/1996 | .......... H04M/29/06 |
| WO | WO 94/24803 | 10/1994 | .......... H04M/11/00 |
| WO | WO 95/18501 | 7/1995 | ............ H04M/1/64 |
| WO | WO 96/05684 | 2/1996 | ............ H04M/3/22 |
| WO | WO 96/09714 | 3/1996 | .......... H04M/11/00 |
| WO | WO 96/38018 | 11/1996 | ............ H04Q/11/04 |
| WO | WO 97/20424 | 6/1997 | ............ H04M/3/42 |
| WO | WO 97/26749 | 7/1997 | ............ H04M/3/54 |
| WO | WO 97/35416 | 9/1997 | ............ H04M/3/42 |
| WO | WO 97/37483 | 10/1997 | ............ H04M/3/42 |
| WO | WO 97/47118 | 12/1997 | ............ H04M/3/42 |
| WO | WO 98/01985 | 1/1998 | ............ H04M/3/42 |
| WO | WO 98/07266 | 2/1998 | ............ H04M/3/42 |

OTHER PUBLICATIONS

Baran, P., "On Distributed Communications Networks", IEEE Transactions on Communications, (Mar. 1964), pp. 1–9.

Shankar, U. and C. Lai, "Interworking Between Access Protocol and Network Protocol for Interswitch ISDN Services", TENCON '89, Bombay, India, Nov. 1989.

(List continued on next page.)

*Primary Examiner*—Fan Tsang
*Assistant Examiner*—Ovidio Escalante (57) ABSTRACT

A method and server for providing intermediate telephone call notification services while increasing the reliability of other call handling services is disclosed. Calls including called party identifier are received at a switch (16,28) forming part of a network (26). The calls are forwarded to a first available notification server (12, 18, 34) in communication with the switch (12, 18, 34), preferably using pre-configured route lists. Each server (12, 18, 34) is capable of providing call notification service for at least some subscribers (10, 22, 30). A server (12, 18, 34) receives a call, including a called subscriber identifier and determine whether the call should be processed as a call for a primary or a secondary subscriber. For calls for a primary subscriber, the server (12, 18, 34) dispatches an indicator of the call. For a call to a secondary subscriber the server forwards the call to a call handling system, such as a voice mail server (36, 38, 40), interconnected with the network.

12 Claims, 5 Drawing Sheets

U.S. PATENT DOCUMENTS

| | | | |
|---|---|---|---|
| 4,995,074 A | 2/1991 | Goldman et al. | 379/93.35 |
| 5,363,431 A | 11/1994 | Schull et al. | 379/88.12 |
| 5,414,754 A * | 5/1995 | Pugh et al. | 379/67 |
| 5,434,906 A | 7/1995 | Robinson | 379/88.23 |
| 5,533,110 A | 7/1996 | Pinard et al. | 379/201.04 |
| 5,550,911 A * | 8/1996 | Bhagat et al. | 379/220 |
| 5,577,105 A | 11/1996 | Baum et al. | 379/93 |
| 5,604,737 A | 2/1997 | Iwami et al. | 370/352 |
| 5,608,786 A | 3/1997 | Gordon | 379/100.03 |
| 5,610,910 A | 3/1997 | Foscaneanu et al. | 370/351 |
| 5,625,676 A | 4/1997 | Greco et al. | 379/88.14 |
| 5,751,792 A * | 5/1998 | Chau et al. | 379/89 |
| 5,805,587 A | 9/1998 | Norris et al. | 370/352 |
| 5,936,951 A * | 8/1999 | Andersson et al. | 370/351 |
| 5,963,618 A * | 10/1999 | Porter | 379/88.17 |
| 6,014,437 A * | 1/2000 | Acker et al. | 379/219 |
| 6,028,917 A * | 2/2000 | Creamer et al. | 379/100.01 |
| 6,078,581 A * | 6/2000 | Shtivelman et al. | 370/352 |
| 6,125,126 A * | 9/2000 | Hallenstal | 370/522 |
| 6,137,806 A * | 10/2000 | Martinez | 370/428 |

OTHER PUBLICATIONS

Casner, et al., "RFC14ZZ: Integrated Service in the Internet Architecture", Sep., 1993.

Clark, D.D., S. Shenker and L. Zhang, "Supporting Real-–Time Applications in an Integrated Services Packet Network: Architecture and Mechanism", SIGCOMM92, Aug. 1992.

Yang, C., "RFC1789: INETPhone: Telephone Services and Servers on Internet", Network Working Group, Apr. 1995.

Braden et al., "RFC 1633: Integrated Services in the Internet Architecture: an Overview", Network Working Group, Jun. 1994.

Burson, A.F. and A.D. Baker, "Optimizing Communications Solutions", IEEE Communications Magazine, 31(1), (Jan. 1993), pp. 15–19.

"Workstation Communications System", IBM Technical Disclosure Bulletin, 37(9), (Sep. 1994), pp. 101–104.

Babbage, R.I. Moffat, A. O'Neill and S. Sivaraj, "Internet Phone—Changing the Telephony Paradigm?", BT Technology Journal, 15(2) (Apr. 1997), pp. 145–157.

Hansson, A., R. Nedjeral and I. Tonnby, "Phone Doubler—A Step Towards Integrated Internet and Telephone Communities", Ericsson Review 4 (1997), pp. 142–151.

"Here It Comes—the Phone Doubler", Ericsson Connexion, (Jun. 1997), p. 47.

"Internet and Ericsson", Ericsson Connexion, (Dec. 1996), pp. 46–47.

Low, C., "The Internet Telephony Red Herring", Hewlett Packard, Laboratories Tech. Report, May 15, 1996, pp. 1–15.

CMP Publications, Inc., Masud, Sam, "Product Supports Voice on Net", Apr. 7, 1997, pp. 1–2.

Business Wire, Inc., "Ericsson Product Allows Simultaneous Voice and Internet Connections Over One Phone Line", Mar. 11, 1997, pp. 1–2.

Business Wire, Inc., "Ericsson's New Phone Doubler Combines Voice and Internet Over a Single Telephone Line", Mar. 10, 1997, pp. 1–2.

* cited by examiner

METHOD AND DEVICE FOR PROVIDING INTERMEDIATE TELEPHONE SERVICE WITH ENHANCED NETWORK RELIABILITY

FIELD OF THE INVENTION

The present invention relates to telephone services, and more particularly to a method and device for providing intermediate telephone call notification services while increasing the reliability of voice mail service.

BACKGROUND OF THE INVENTION

Telephone network based voice mail allows callers to leave voice messages when a telephone subscriber is unavailable, resulting from a busy subscriber line, or from a subscriber not answering a ringing line. Typically, voice-mail service is implemented by one or more voice mail servers ("VMS"s) that are physically separate from the telephone subscriber's central office switch ("CO"). When the subscriber is unavailable, the CO executes an appropriate forwarding feature to connect a caller to the proper VMS allowing the caller to leave a voice mail message for later listening by the subscriber. If the subscriber does not answer, the known CO call forward no answer ("CFNA") feature forwards the incoming call to the VMS. Similarly, if the subscriber line is busy, the CO call forward busy line ("CFBL") feature causes the CO to forward the call to the VMS.

As understood by those skilled in the art, COs supporting the CFNA/CFBL features allow an administrator to associate alternate telephone dial numbers ("DN"s) for each subscriber DN. The CO forwards calls directed to the subscriber DN in the event the subscriber line is busy or is not answered.

Recently, various other enhanced telephony services in addition to network-based voice mail have become available. These services are referred to as "intermediate services" and are often also provided by stand-alone servers that are physically separate from both the CO and the VMSs. These intermediate services are typically provided after a call has been forwarded to a CO, and prior to ultimate call disposal, to, for example, a VMS. Usually these intermediate services rely on either the CFNA or CFBL features. Using these features, calls are transferred to a DN associated with an intermediate service server. Ultimately a call processed by an intermediate server may be transferred to a VMS by the intermediate service server for subscribers that subscribe to both the intermediate service and VMS service. The intermediate server typically maintains a database and uses the database to forward the call to the appropriate VMS. In this sense, the service assumes an intermediate role between the CO and the VMS.

Intermediate services typically provide a notification of an incoming call, that may be received by a subscriber or may be further processed. An example of an intermediate service is Internet Call Waiting ("ICW") service, as disclosed in U.S. patent application Ser. No. 08/911,036, the contents of which are hereby incorporated by reference herein. ICW notifies subscribers who are connected to the Internet by way of a dial-up connection of incoming telephone calls directed to their telephone line by way of the internet. Calls to an unavailable subscriber are initially forwarded to a separate ICW server by the CO via the CFBL feature, and are subsequently forwarded to the subscriber's VMS if the subscriber is not in fact connected to the internet, or if disposed of by the subscriber. Other intermediate services may include wireless pager notification of an incoming call; cellular network call notification of an incoming call to a cellular telephone; or "single number service" that forwards calls to one of a list of alternative DNs to notify the subscriber of an incoming call.

However, as incoming calls are typically transferred to an intermediate server and then to a VMS, failure of a conventional intermediate server impacts the provision of intermediate services and additionally adversely impacts the reliability of VMS service. As subscriber-specific VMS information typically resides solely on the single intermediate server assigned to a subscriber, proper VMS call forwarding becomes impossible when the server becomes unavailable. The CO is only able to connect the caller with the busy signal. Disadvantageously, then, the failure of the intermediate server prevents the caller from being able to leave a voice message, even though the VMS may be fully operational.

Similarly, the provision of intermediate services in this manner prevents a caller from receiving intermediate service in the event that the single interconnected intermediate server fails or otherwise becomes unavailable. Disadvantageously, no provision for backup intermediate service exists.

Accordingly, the present invention attempts to provide an arrangement of intermediate servers to overcome some of the disadvantages of known intermediate server arrangements.

SUMMARY OF THE INVENTION

It is an object of this invention to provide a method and device that improves the reliability of network call handling systems.

Advantageously, the method and device may also provide backup intermediate service through the use of alternate intermediate servers.

In accordance with an aspect of the present invention there is provided a method of operating first and second servers on a telephony network. Each of the first and second servers are operable to provide a subscribed telephony service in response to receiving incoming calls for specified subscribers prior to the incoming calls being processed at one or more additional call handling systems. The method includes: associating with the first server a first plurality of primary subscribers for whom the subscribed telephony service is to be provided by the first server; associating with the second server, a second plurality of primary subscribers for whom the subscribed telephony service is to be provided by the second server, the first plurality being different from the second plurality; receiving an incoming call for one of the first plurality of primary subscribers, at the first server; in response to the receiving an incoming call for the one of the first plurality of primary subscribers, providing the subscribed telephony service to the incoming call for one of the first plurality of primary subscribers at the first server; receiving an incoming call for one of the second plurality of primary subscribers, at the first server, in the event of unavailability of the second server; forwarding the incoming call for the one of the second plurality of primary subscribers from the first server to a downstream call handling system within the telephony network associated with the one of the second plurality of primary subscribers, thereby ensuring access to the downstream call handling system for calls for the second plurality of primary subscribers in the event of unavailability of the second server.

In accordance with another aspect of the present invention there is provided a method of operating a first server on a telephony network. The telephony network includes the first server and a second server, each operable to provide a subscribed telephony service in response to receiving incoming calls for specified subscribers prior to the incoming calls being processed at one or more additional call handling systems. The method includes: associating with the first server a first plurality of primary subscribers for whom the subscribed telephony service is to be provided by the first server; receiving an incoming call for one of the first plurality of primary subscribers, at the first server; in response to receiving the incoming call for the one of the first plurality if primary subscribers, providing the subscribed telephony service to the incoming call for the one of the first plurality of primary subscribers at the first server; receiving an incoming call for one of a second plurality of primary subscribers for whom the subscribed telephony service is provided by the second server, at the first server, in the even of unavailability of the seond server; in response to receiving the incoming call for the one of the second plurality of primary subscribers, forwarding the incoming call for the one of the second plurality of primary subscribers from the first server to a downstream call handling system within the telephony network associated with the one of the second plurality of primary subscribers, without providing the subscribed telephony service to the incoming call for the one of the second plurality of primary subscribers at the first server, thereby ensuring access to the downstream call handling system for calls for the second plurality of primary subscribers in the even of unavailability of the second server.

BRIEF DESCRIPTION OF THE DRAWING

In figures which illustrate preferred embodiments of the invention.

DETAILED DESCRIPTION

Figure 1:
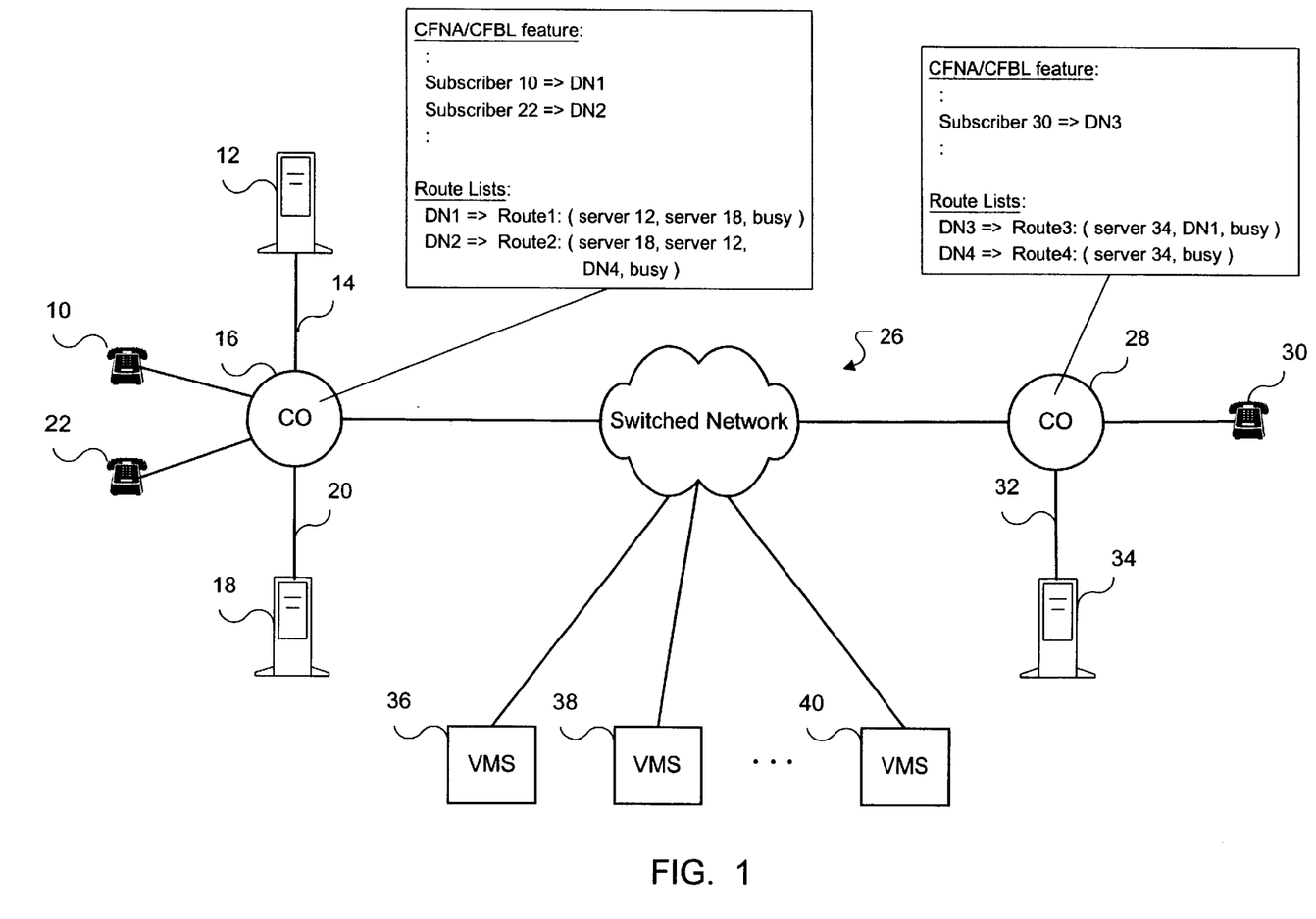
FIG. 1 illustrates a telecommunications network exemplary of an embodiment of the present invention.

FIG.1 illustrates, by way of example, a plurality of intermediate notification service servers 12, 18 and 34 exemplary of embodiments of the present invention. Servers 12 and 18 and server 34 are interconnected with COs 16 and 28, respectively. COs 16 and 28 form part of, and are interconnected with the remainder of, switched network 26, which may, for example, the public switched telephone network ("PSTN"). Trunks 14 and 20 interconnect servers 12 and 18 to CO 16. Two exemplary telephone subscribers 10 and 22 interconnected with CO 16 are also illustrated. CO 28 is connected to intermediate server 34, by trunk 32, and to a third exemplary telephone subscriber 30. COs 16 and 28 are additionally connected, by way of switched network 26, to VMSs 30 36, 38 and 40, which also form part of switched network 26. As will be appreciated, the connection of COs 16 and 28 to VMSs 36, 38 and 40 need not be through switched network but may also be direct.

Subscribers 10, 22, and 30 are exemplary of telephone subscribers who subscribe to VMS services and additionally subscribe to an intermediate telephone service. As noted, intermediate telephone service typically comprise enhanced telephony services, such as the ICW service, usually provided by a stand-alone server separate from the CO. The server also typically forwards calls to a subscriber's VMS in the event that intermediate service processing reveals the service to be inappropriate. As will be appreciated, not all telephone subscribers will subscribe to intermediate services or VMS services.

VMSs 36, 38 and 40 are standalone servers capable of provision of network-based voice mail service. VMSs 36, 38 and 40 may, for example, be Nortel™ Meridian Voice Mail servers.

COs 16 and 28 are class 5 switches which may, for example, be Nortel™ DMS-100 central office switching centers. Each CO 16 and 28 preferably provides CFNA and CFBL call forwarding capabilities which permit calls to be forwarded, on a subscriber-specific basis, to one or more alternate DNs when a subscriber does not answer or the line is busy.

As understood by those skilled in the art, each of COs 16 and 28 may also maintain route lists. Exemplary route lists Route1, Route2, Route3 and Route4 comprised of a plurality of resource identifiers representing intermediate servers or alternate DNs are illustrated in FIG. 1. Each route list is identified by its own associated DN. The route lists enumerate alternative telephony resources, identified by resource identifiers, listed in sequential order of preference in the route list. Each resource identifier represents a resource to which a CO 16 or 28 will attempt to route calls forwarded to the DN associated with the route list, if the resource is available. Calls directed the DN associated with a route list will be forwarded to identifiers within the route list. As will become apparent, route lists Route1, Route2, Route3 and Route4 are used in combination with the CFNA and CFBL features of COs 16 and 28 to facilitate the connection of callers to the servers 12, 18 or 34. Route lists may be configured as described by an administrator of COs 16 and 28. It is worth noting that the administrators/operators of COs 16, 28; VMSs 36, 38 and 40; and servers 12, 18 and 34 may be unrelated.

Servers 12, 18 and 34 are preferably conventional computing devices that provide intermediate telephone service for subscribers. In normal operation, in the example embodiment, intermediate service for subscriber 10 is provided by server 12, intermediate service for subscriber 22 is provided by server 18, and intermediate service for subscriber 30 is provided by server 34. Subscribers 10, 22 and 30 may thus be considered "primary subscribers" of servers 12, 18 and 34, respectively. In the described embodiment, an intermediate server's "primary subscribers" are directly connected to the same CO as is the intermediate server. However, an intermediate server's "primary subscribers" could be directly connected to COs other than the CO to which that intermediate server is connected. The assignment of primary subscribers to servers is achieved through the CFNA and/or CFBL features of COs 16 and 28, route lists within COs 16 and 28, and subscriber data stored within each server 12, 18 and 34, as will become apparent.

Each intermediate server 12, 18 and 34, in addition to its primary subscribers, may be associated with a plurality of "secondary subscribers". Secondary subscribers are subscribers whose calls are routed to a particular server due to the unavailability of a primary server to which their calls are usually routed under normal operating conditions.

Unlike primary subscribers in the example embodiment, secondary subscribers of a particular server are all not connected to the same CO as that server. For example, server 12 has, in addition to its primary subscriber 10, two secondary subscribers 22 and 30 whose calls may be routed to server 12 when the servers normally associated with those subscribers (servers 18 and 28 respectively) are unavailable. Similarly, server 18 has two secondary subscribers 10 and 30 whose calls may be routed to server 18 when the servers 12 and 34 are unavailable. Finally server 34 has one secondary subscriber 22. As will become apparent, the processing of secondary subscribers' calls, in addition to primary subscribers' calls, by intermediate servers 12, 18 and 34 increases the overall reliability of voice mail service exemplary of the present invention, and potentially, the reliability of intermediate service as well.

Figure 2:
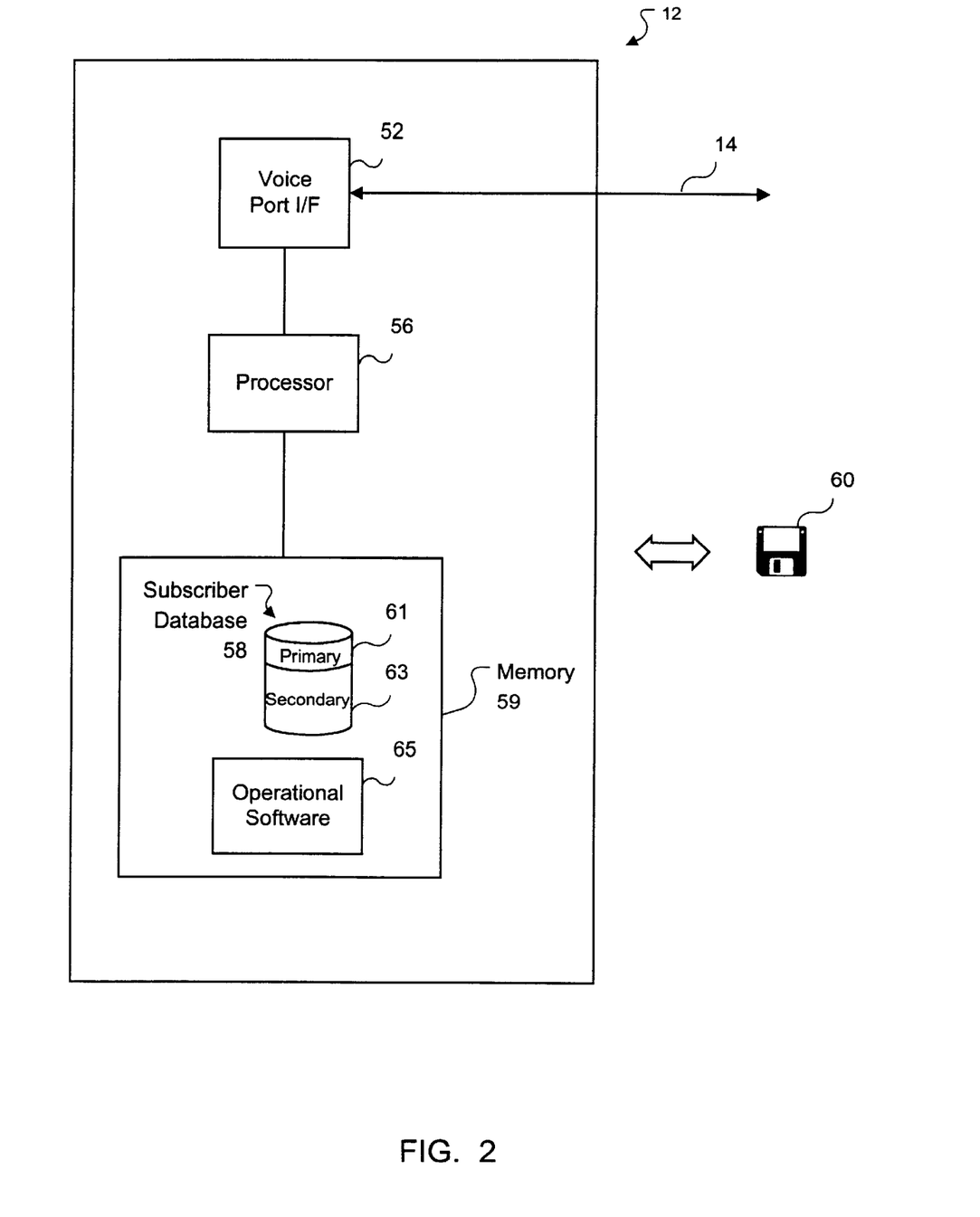
FIG. 2 illustrates in block diagram an architecture of an intermediate server exemplary of an embodiment of the present invention.

FIG. 2 illustrates the exemplary architecture of intermediate server 12. Intermediate servers 12, 18 and 34 (FIG. 1) are substantially identical. Server 12 is typically a conventional computing device, such as an Intel x86 based computer acting as a Windows NT server or client, a UNIX based server or the like.

As illustrated, server 12 comprises a processor 56 interconnected to a switched network interface 52 and persistent memory 59. Switched network interface 52 permits server 12 to be interconnected with CO 16 (FIG. 1) by trunk 14, allowing multiple calls to be routed between server 12 and CO 16 simultaneously. Switched network interface 52 is preferably an ISDN primary rate interface ("PRI") or a known signalling system seven ("SS7") interface. As will be appreciated, each call provided to interface 52 is accompanied by suitable signalling information.

Persistent memory 59 comprises a subscriber database 58, and operational software 65 adapting server 12 to act as an intermediate server in a manner exemplary of the present invention. Database 58 contains subscriber information required by server 12 for the servicing of its subscriber's calls. Database 58 is comprised of primary subscriber data 61, and, secondary subscriber data 63. Primary subscriber data 61 is comprised of multiple data records, each of which pertains to a single primary subscriber. Secondary subscriber data 63 is also comprised of multiple data records. Each of these records, however, relates to a secondary subscriber and possibly contains different types of data than primary subscriber data records. Data within subscriber database 58 could be shared between multiple intermediate servers through, for example, centralization of the database or replication of data between locally-maintained databases to ensure coherency, using techniques known to those skilled in the art. Server 12 is also typically equipped with a peripheral (not shown) capable of reading software and data from removable storage medium 60 such as a diskette, CD-ROM, ROM cartridge, digital tape or the like.

Server 12 may further comprise service-specific components which are necessary for certain types of intermediate services. For example, if intermediate service being provided is ICW, server 12 may include a network interface (not shown) for connection to a computer network such as the public internet.

Figure 3A:
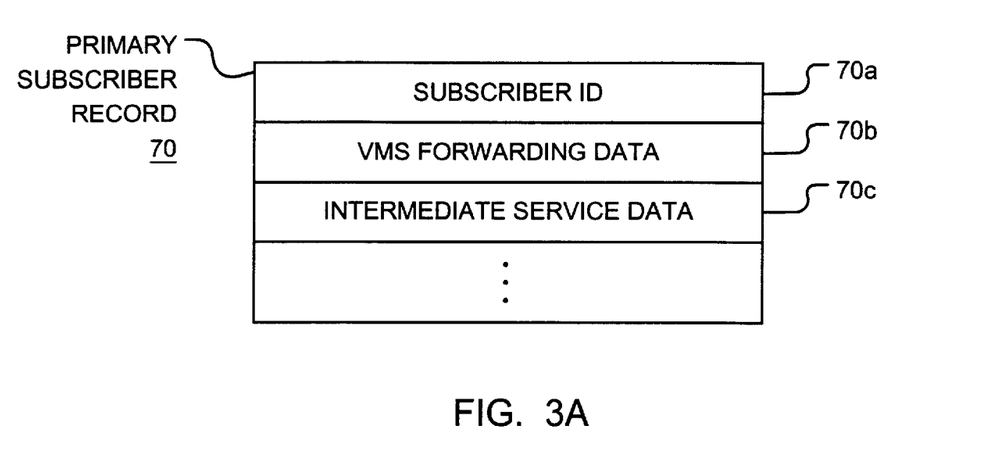
FIGS. 3A and 3B illustrate examples of data records that may be used by the intermediate server of FIG. 2.
Figure 3B:
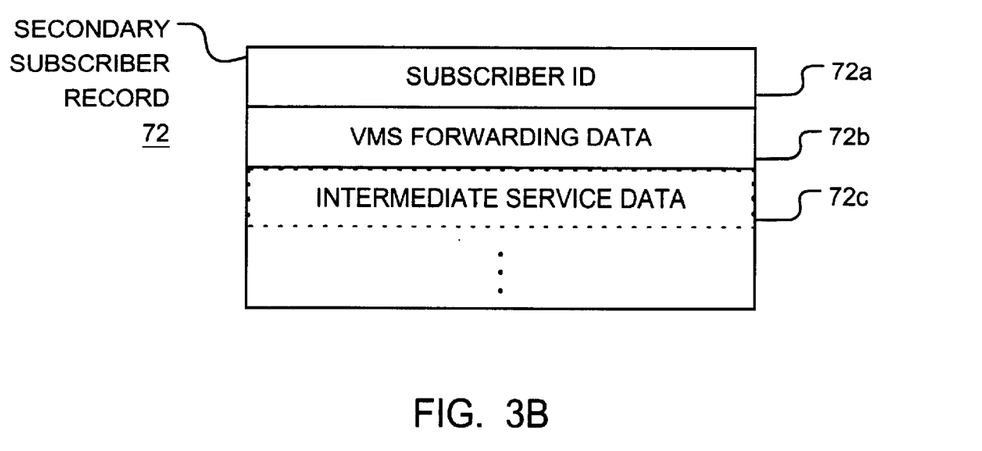

FIGS. 3A and 3B illustrate example data records maintained within subscriber database, 58 of server 12. Similar records are maintained by servers 18 and 34. FIG. 3A shows an exemplary primary subscriber record 70, forming part of primary subscriber data 61, associated with a primary subscriber of server 12. Record 70 comprises fields 70a, 70b, and 70c. Subscriber ID field 70a of record 70 holds data uniquely identifying the primary subscriber and may contain, for example, the primary subscriber's DN. Field 70b comprises an indicator of a subscriber's VMS. Intermediate service data field 70c contains subscriber specific information relevant to the intermediate service being provided, and may comprise data which must be maintained in field 70c to provide a particular intermediate service. Of course, additional fields (not shown) may be present within primary subscriber record 70.

FIG. 3B shows an exemplary secondary subscriber record 72, forming part of subscriber data 63, associated with a secondary subscriber of server 12. Record 72 is comprised of a number of fields 72a and 72b. Subscriber ID field 72a of record 72 holds data uniquely identifying the secondary subscriber and may contain, for example, the secondary subscribers DN. Field 72b contains an identifier of the subscriber's VMS, such as for example a DN of the subscriber's VMS. Optionally, record 72 may include an intermediate service data field 72c. Field 72c may be used for the optional provision of full intermediate service, instead of VMS call forwarding, upon the matching of an incoming call's subscriber ID With a secondary subscriber record. Of course, additional fields may also be present within secondary subscriber records 72 in some embodiments.

While primary and secondary subscriber records have been illustrated as being logically separate, a person skilled in the art will appreciate that server 12 may distinguish between primary and secondary subscribers in other ways. For example, all subscriber records in a database could include a further field identifying a subscriber as a primary or secondary subscriber. Similarly, server 12 could be adapted to be identified by two separate DNs instead of one trunk identifier. Calls forwarded to one DN would be processed as calls for primary subscribers; calls forwarded to a second DN would be processed as calls for a secondary subscriber.

Figure 4A:
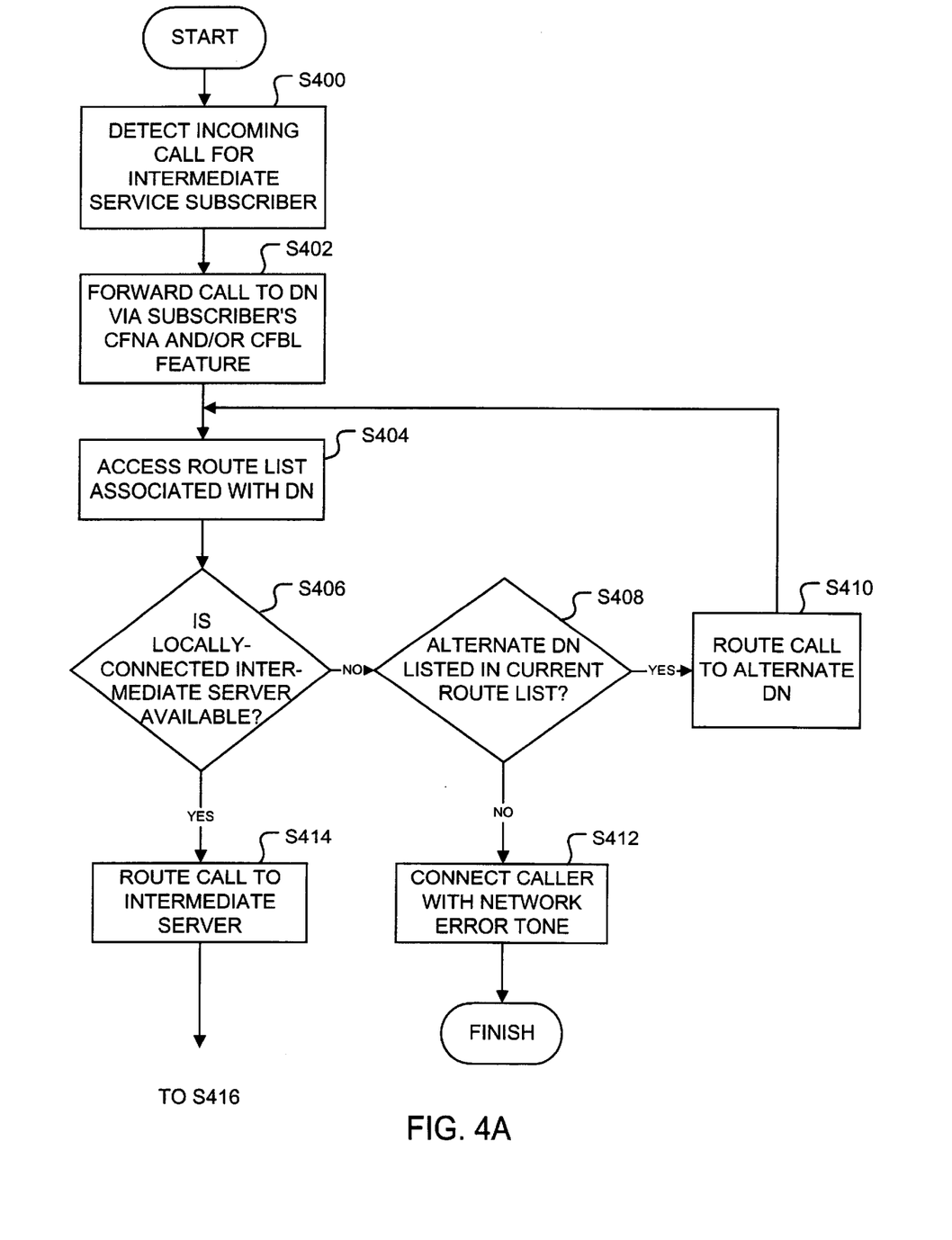
FIGS. 4A and 4B are flow charts illustrating a method exemplary of an embodiment of the present invention.
Figure 4B:
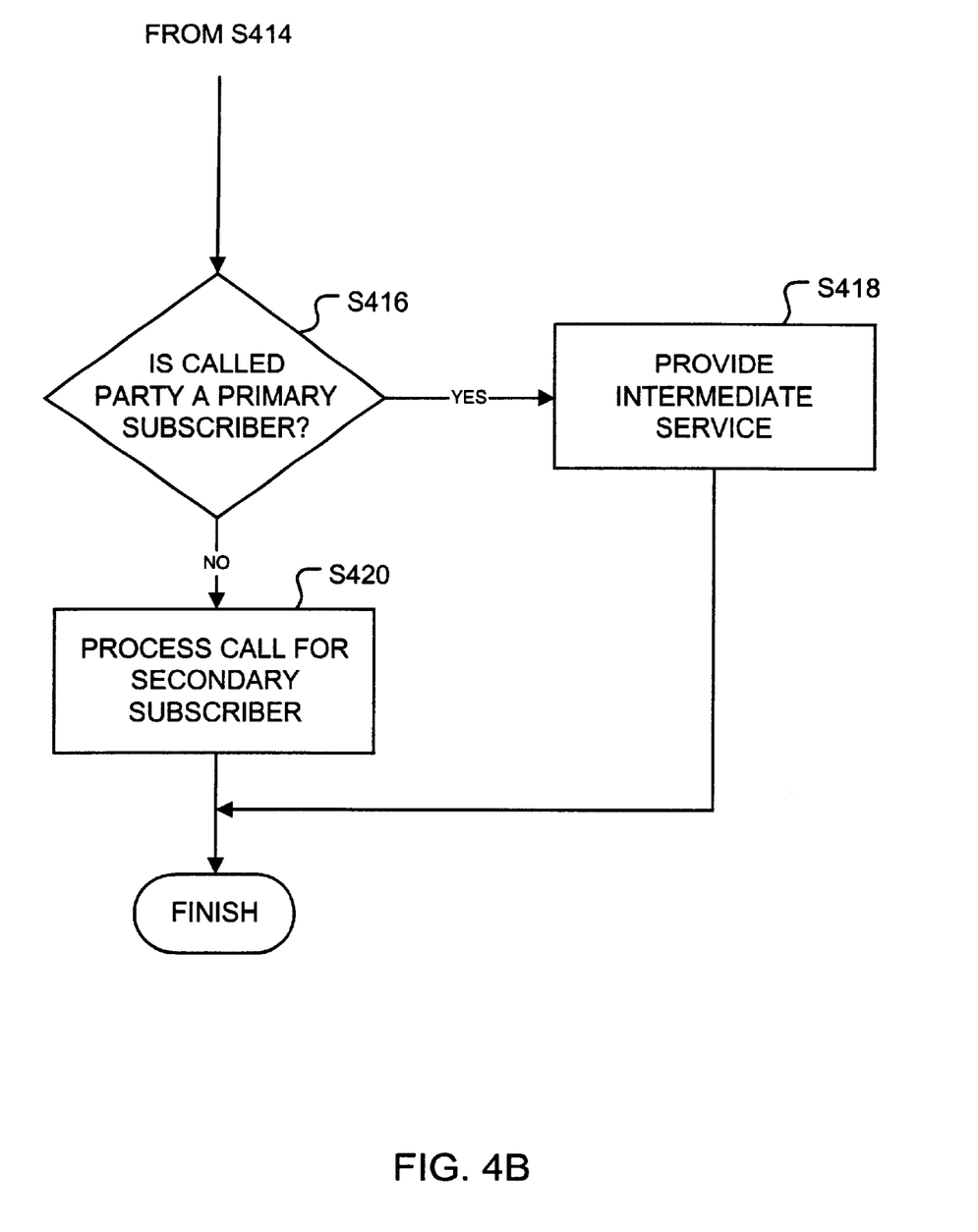

The operation of the present embodiment is illustrated by way of examples, with reference to FIGS. 4A and 4B. Assuming that a subscriber 30 initiates a call to intermediate service subscriber 22, the incoming call of subscriber 30 is detected in step S400 (FIG. 4A) at CO 16 connected to subscriber 22, the intended recipient of the call. Assuming that subscriber 22 either does not answer or has a busy line, in step S402 the CFNA or CFBL feature of CO 16 forwards the call to an appropriate DN for subscriber 22, associated with the CFNA or CFBL feature, as would be understood by a person skilled in the art. In this example, the call is forwarded to DN2 at Co 16. DN2 is associated with route list Route2. Thus in step S404, CO 16 uses directory number DN2 to access the associated route list Route2.

In the illustrated embodiment, Co 16 determines whether a locally connected intermediate server (i.e. a server directly connected to CO 16) is available in step S406. CO 16 accomplishes this by sequentially parsing route list Route2 and determining whether or not the enumerated servers are available. In the illustrated embodiment the first entry of Route2 is server 18 (typically represented in route list Route2 by the identifier of associated trunk 20). CO 16 determines the availability of server 18 by, for example, monitoring a signalling channel of trunk 20 or by processing messages from server 18 reflective of its status, or by attempting to communicate with server 18. It will be appreciated that the availability status of servers 18 and 12 may be maintained by CO 16, or alternatively may be obtained as needed by CO 16 through polling or other on-demand techniques. An "unavailable" status may, for example, be due to hardware or software failure at the server; ongoing maintenance of the server; disconnection of the server's associated trunk; or because all the circuits of the associated trunk are in use. Assuming that CO 16 determines that server 18 is indeed available, CO 16 routes the call, including information about the ID of the called subscriber, 22, to server 18 in step S414. Intermediate server 18 accesses the called party subscriber ID information associated with the incoming call and compares it with primary and secondary subscriber data 61 and 63, respectively, from its subscriber database 58 in order to determine whether the called party is a primary or secondary subscriber of server 18 in step S416 (FIG. 4B).

Because the called subscriber 22 in the example is indeed a primary subscriber of server 18, server 18 accesses the primary subscriber record 70 for subscriber 22, and specifically, the data contained within intermediate service data field 70c. This data is then used to provide intermediate service in step S418. Once intermediate service is complete, the call may be transferred to VMS 36 or terminated in a conventional manner.

The enhanced reliability provided by the embodiments of FIG. 1 may be better appreciated with reference to a variation of the above example in which server 18 is not available. Assuming that subscriber 30 once again initiates a call to subscriber 22 and that subscriber 22 either does not answer or has a busy line, the CO 16 performs steps S400, S402, and S404 as described above in the same manner as the case in which intermediate server 18 was available. In step S406, however, CO 16 now detects that server 18 is not available. As a result, CO 16 further parses route list Route2 to identify the next entry, which in the present example is server 12, typically represented by the identifier of its associated trunk 14 in route list Route2. Assuming that server 12 is available, CO 16 detects that fact in the manner described above and routes the call, along with its associated called party subscriber caller ID information, to server 12 in step S414.

In step S416 (FIG. 4B), server 12 accesses the called party subscriber information associated with the incoming call and compares it with data from its subscriber database 58 in order to determine whether the called party is a primary or secondary subscriber. If the comparison reveals that the call is Intended for a secondary subscriber of server 12, server 12 processes the call for the secondary subscriber in step S420. The processing for secondary subscribers is comprised minimally of VMS call forwarding, in which case server 12 accesses the secondary subscriber record 72 of subscriber 22, and specifically, the data contained within VMS forwarding data field 72b, and uses this data to forward thin call to the designated VMS of subscriber 22. If the subscriber is neither a primary nor a secondary subscriber for server 12, server 12 causes an appropriate error signal, such as an error tone, to be generated.

Service for secondary subscribers, including subscriber 22, may however, optionally comprise full intermediate service. In that case, server 18 accesses the data contained within intermediate service data field 72c and uses it to provide full intermediate service for the subscriber. For example, server 12 may provide the ICW service or a similar service to subscriber 22. Once intermediate service is complete, the call is terminated in a conventional manner. Hence, server 12 effectively provides "backup" service for subscriber 22 in the case where server 18 is unavailable, thereby promoting enhanced voice mail service reliability (and optionally, intermediate service reliability). As will be appreciated, if the intermediate service provided by server 12 is identical for primary and secondary subscribers, distinction between primary and secondary subscribers at server 12 may become unnecessary.

The enhanced reliability provided by the embodiments of FIG. 1 may be better appreciated with reference to a further example, in which servers 18 and 12 are both not available. Assuming that subscriber 30 once again initiates a call to subscriber 22 and that subscriber 22 either does not answer or has a busy line, CO 16 performs steps S400, S402, and S404 as described above in the same manner as the case in which intermediate servers 18 and 12 were available. In step S406, however, CO 16 now detects that servers 18 and 12 are both unavailable and as a result, further parses route list Route2 to identify the next entry, DN4. At this stage, CO 16 determines that all locally-connected servers 18 and 12 are unavailable. In step S408, CO 16 ascertains that there is in fact an alternate DN in the current route list, namely, DN4, and as a result, forwards the call, along with the associated called party subscriber ID information, to DN4 in step S410. DN4 is associated with a CO 28 and also route list Route4 at CO 28.

Once the call is forwarded to DN4, CO 28 processes the call, and in step S404, uses directory number DN4 to access the associated route list Route4. In step S406, CO 28 sequentially parses route list Route4 to first determine whether any servers server directly connected to CO 28 are available. In the illustrated embodiment, the first entry of route list Route4 is an identifier of server 34, which is assumed to be available in this scenario. CO 28 determines that server 34 is in fact available, and in step S414, routes the call, which includes information about the ID of the called subscriber 22, to server 34. Intermediate server 34 accesses the called party subscriber ID information associated with the incoming call and compares it with subscriber information from its subscriber database 58 in order to determine whether the called party is a primary or secondary subscriber in step S416 (FIG. 4B). The comparison reveals the call as being intended for a secondary subscriber of server 34, since the information from the database 58 indicates that called subscriber 22 is not a primary subscriber of server 34. Server 34 then processes the call for the secondary subscriber in step S420. As noted, the processing for secondary subscribers may be comprised minimally of VMS call forwarding. Server 34 then accesses the secondary subscriber record 72 of subscriber 22, specifically, the data contained within VMS forwarding data field 72b, and uses this data to forward the call to the designated VMS of subscriber 22. Again, service for secondary subscribers may optionally be comprised of full intermediate service. Hence, server 34 has effectively provided "backup" service for subscriber 22 in the case where both server 18 and server 12 are unavailable.

Alternatively if server 34 is also not available, in step S406, CO 28 detects that server 34 is unavailable and as a result, parses route list Route4 to identify the next entry, "busy". At this stage, CO 28 has determined that all locally connected servers are unavailable. In step S408, CO 28 ascertains that the only remaining resource in the current route list Route4, is the network busy tone and accordingly connects the call to this network error tone (typically the busy signal) in step S412. Note that in this latter example, intermediate service and VMS forwarding are both not possible because no intermediate servers are available to provide the necessary processing.

Ultimately, the designation of subscriber 22 as a secondary subscriber on servers 12 and 34 and the corresponding routing chain formed by route lists Route2 and Route4 effectively provides two backup intermediate serves for server 18: one connected to the same CO 16 (server 12) and one connected to a different CO 28 (server 34), thereby promoting enhanced voice mail service (and optionally, intermediate service) reliability.

It should be noted that circular references to route lists should be avoided. A route list maintained at CO 16 or 34 should not reference route lists at other COs if the resulting routing chain creates the possibility of control being returned to the initial list. In the present embodiment, for instance, route list Route4 should not contain an additional entry DN2 between entries "server 34" and "busy", since route lists Route2 and Route4 would then mutually reference one another, potentially causing such undesirable side effects as infinite looping and wasting of CO resources.

While the above embodiments have been described in the context of the PSTN, a person skilled in the art will readily appreciate that the embodiments could be modified to operated in association with a private telephone network, a cellular or wireless network, or any similar network.

As well, while the embodiments have been described in the context of enhancing VMS service, a person skilled in the art will appreciate that the invention could easily be utilized to enhance reliability of other call handling services as provided by other call handling systems, such as a call center, an interactive voice response system, or the like.

The foregoing is merely illustrative of the principles of the invention. Those skilled in the art will be able to devise numerous arrangements, which, although not explicitly shown or described herein, nevertheless embody those principles that are within the spirit and scope of the invention, as defined by the claims.

What is claimed is:

1. A method of operating first and second servers on a telephony network, each of said first and second servers operable to provide a subscribed telephony service in response to receiving incoming calls for specified subscribers prior to said incoming calls being processed at one or more additional call handling systems, said method comprising:

associating with said first server a first plurality of primary subscribers for whom said subscribed telephony service is to be provided by said first server;

associating with said second server, a second plurality of primary subscribers for whom said subscribed telephony service is to be provided by said second server, said first plurality being different from said second plurality;

receiving an incoming call for one of said first plurality of primary subscribers, at said first server, in response to said receiving an incoming call for said one of said first plurality of primary subscribers, providing said subscribed telephony service to said incoming call for said one of said first plurality of plurality subscribers at said first server;

receiving an incoming call for one of said second plurality of primary subscribers, at said first server, in the event of unavailability of said second server;

forwarding said incoming call for said one of sad second plurality of primary subscribers from said first server to a downstream call handling system within said telephony network associated with said one of said second plurality of primary subscribers, thereby ensuring access to said downstream call handling system for calls for said second plurality of primary subscribers in the event of unavailability of said second server.

2. The method of claim 1, further comprising receiving an incoming call for one of said second plurality of subscribers, at said second server;

in response to said receiving an incoming call for said one of said second plurality of primary subscribers, providing said subscribed telephony service to said incoming call for said one of said second plurality of primary subscribers at said second server; receiving an incoming call for one of said first plurality of primary subscribers, at said second server, in the event of unavailability of said first server;

forwarding said incoming call for said one of said first plurality of primary subscribers from said second server to a downstream call handling system within said telephony network associated with said one of said first plurality of primary subscribers thereby ensuring access to said downstream call handling system for calls for said first plurality of primary subscribers in the event of unavailability of said first server.

3. The method of claim 2, wherein said subscribed telephony service comprises dispatching an indicator of an incoming call to a subscriber to whom said incoming call is destined.

4. The, method of claim 1, wherein each incoming call further comprises an identifier of a called subscriber.

5. The method of claim 4, further comprising comparing an identifier of a called subscriber of said incoming call for said one of said second plurality of subscribers at said first server to entries within a subscriber database at said first server.

6. The method of claim 5, further comprising comparing an identifier of a called subscriber of said incoming call for said one of said first plurality of subscribers at said fist server to entries within said subscriber database at said first server.

7. The method of claim 1, wherein said providing said subscribed telephony service comprises dispatch an indicator of said incoming call for said on of said first plurality of primary subscribers over a second network.

8. The method of claim 7, wherein said second network comprises a data network.

9. The method of claim 1, wherein said downstream call handling system comprises a voice mail system associated with said one of said second plurality of primary subscribers.

10. The method of claim 9, wherein an identifier of said voice mail system for said primary subscribers is maintained at said first server, and used to forward said incoming call for said one of said second plurality of primary subscribers.

11. The method of claim 1, wherein said first server is identified by first and second dial numbers on said telephone network, and an incoming call for one of said first plurality of primary subscribers is distinguished from an incoming call for one of said second plurality of primary subscribers by distinguishing between said first and second dial numbers.

12. A method of operating a first server on a telephony network, said telephony network comprising said first server and a second server, each operable to provide a subscribed telephony service in response to receiving incoming call for specified subscribers prior to said incoming calls being processed at one or more additional call handling systems, said method comprising:

associating with said first server a first plurality of primary subscribers for whom said subscribed telephony service is to be provided by said first server, receiving an incoming call for one of said first plurality of primary subscribers, at said fist server;

in response to said receiving said incoming call for said one of said first plurality of primary subscribers, providing said subscribed telephony service to said incoming call for said one of said first plurality of primary subscribers at said first server;

receiving an incoming call for one of a second plurality of primary subscribers for whom said subscribed telephony service is provided by said second server, at said first server, in the event of unavailability of said second server;

in response to receiving said incoming call for said one of said second plurality of primary subscribers, forwarding said incoming call for said one of said second plurality of primary subscribers from said first server to a downstream call handling system within said telephony network associated with said one of said second plurality of primary subscribers, without providing said subscribed telephony service to said incoming call for said one of said second plurality of primary subscribers at said first server, thereby ensuring access to said downstream call handling system for calls for said second plurality of primary subscribers in the event of unavailability of said second server.

* * * * *